Nov. 15, 1966     D. S. CUSHING     3,286,149
CONTROL MEANS FOR ELECTRIC MOTOR START WINDING
Filed Feb. 24, 1964

INVENTOR.
DONALD S. CUSHING
BY James E. Espe
HIS ATTORNEY

United States Patent Office 3,286,149
Patented Nov. 15, 1966

3,286,149
CONTROL MEANS FOR ELECTRIC MOTOR
START WINDING
Donald S. Cushing, Louisville, Ky., assignor to General
Electric Company, a corporation of New York
Filed Feb. 24, 1964, Ser. No. 346,606
4 Claims. (Cl. 318—221)

This invention relates generally to electric motors and, more particularly, to an improved starting means for an electric motor.

Single-phase induction motors are provided with a run winding and a start winding whereby the run winding remains energized throughout the entire operaiton of the motor while the start winding is energized for a brief period at the beginning of operation, to assist in starting the motor, and is then deenergized. Many reasons exist for deenergizing the start winding rather than leaving it energized during entire operation of the motor. One important reason is that the start winding is made of small diameter wire, due to the desired resistance characteristics as well as space requirements, and such small wire is incapable of withstanding continued exposure to the voltage normally required for starting. For example, the start winding on a common commercially available single-phase induction motor, designed to operate 110 volts A.C., will burn out if subjected to the 110 volts for a period in excess of approximately 20 seconds with a locked rotor or 10 minutes if the motor is running.

Various means have been proposed heretofore to deenergize the start winding as the motor comes up to normal operating speed, at which point the start winding is no longer required. These means include centrifugal switches responsive to the motor speed, and relays responsive to the current passing through the run winding. Moreover, manual start arrangements have been employed whereby the start winding is manually energized and deenergized as needed. Obvious disadvantages of these arrangements are the costs connected with relays and centrifugal switches as well as the probability of malfunction. Also, the manual start arrangement is clearly incompatible with an arrangement, such as in an automatic washing machine, where a series of starts and stops of the motor is required in an automatic cycle.

Accordingly, it is an object of this invention to provide an improved starting means for an electric motor having start windings.

It is another object of this invention to provide a starting means for an electric motor which obviates costly relays or centrifugal switches.

Briefly stated, the present invention is particularly adapted for use with an automatic appliance having a sequence control means to conduct the appliance through a series of operations and an electric motor to effectuate certain of these series of operations, the electric motor having a start winding which may be de-energized during certain periods of operation of the motor. Such an appliance may be an automatic dishwasher or an automatic clothes washing machine. In one aspect of the invention, there is provided an improvement comprising a switch adapted, when operated, to de-energize the start winding and means associated with the sequence control means to periodically open and close the switch. With this arrangement, if the switch energizes the start winding at a time, as prescribed by the sequence control means when the electric motor should be started, energization of the start winding will result in starting of the motor. However, if the switch energizes the start winding when the main motor switch is opened or when the motor is already running, the energization of the start winding will have little or no effect. The present invention therefore replaces a costly relay or centrifugal switch, or an incompatible manual start arrangement, with an inexpensive switch associated with the sequence control means.

While the specification concludes with claims particularly pointing out and distinctly claiming the subject matter which is regarded as the invention, it is believed the invention will be better understood from the following description taken in connection with the accompanying drawings, in which:

Figure 1:
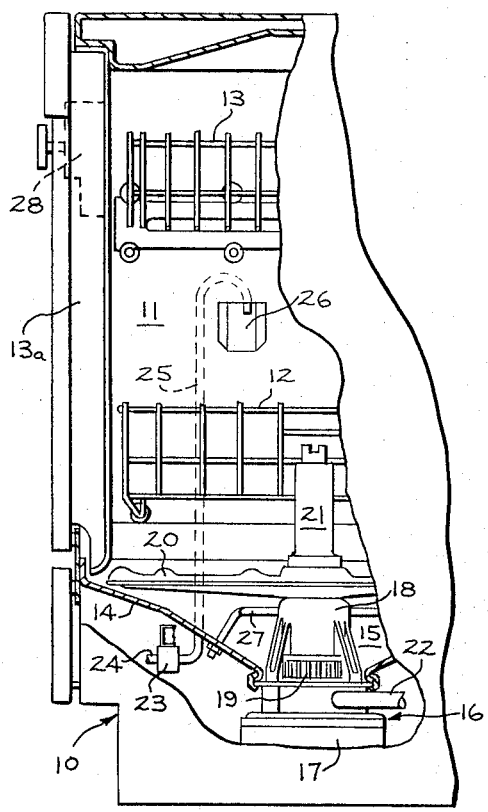
FIGURE 1 is a partial side view, partially cut away to show details, of an automatic washing machine employing the present invention.

Referring now to the drawing, and particularly to FIGURE 1, there is shown an automatic washing machine in the form of an automatic dishwasher 10 having a wash chamber 11 within which are disposed dish supporting racks 12 and 13. A door 13a is provided to allow access to wash chamber 11 so that dishes or other articles to be washed may be placed into racks 12 and 13. Wash chamber 11 is defined at the bottom by wall 14 which has a centrally depressed portion forming a sump 15. Supported by bottom wall 14, generally in the center of sump 15, is a motor-pump unit 16 comprising a motor 17 and a pump 18. Pump 18 has an inlet 19 which draws wash fluid from sump 15 and, in one direction of rotation of motor 17, propels the wash fluid up through a reaction type spray arm 20 and an extendable spray tube 21 to create a wash action upon articles supported by racks 12 and 13. In the opposite direction of rotation of motor 17, pump 18 draws wash fluid from sump 15 through inlet 19 and propels it out through effluent discharge 22 which may communicate with a common household sewer system (not shown).

A valve 23 is provided to control the admission of wash fluids into chamber 11. A conduit 24 interconnects valve 23 with a wash fluid source (not shown). Conduit 25 interconnects valve 23 with an inlet port 26 formed in one wall of wash chamber 11 at a point sufficiently elevated to preclude loss of wash fluids therethrough. An electrical resistance heating means 27 is provided in wash chamber 11 to facilitate drying of the articles after they have been washed and, if desired, to assist in heating wash fluids within chamber 11 during the washing operation.

For purposes of illustration only, it will be understood that a typical full operating cycle of dishwasher 10 may include a suitable number of rinsing, washing and drying steps. For example, the cycle may include a preliminary rinse in which valve 23 is opened to allow the admission of wash fluid into chamber 11 and pump 18 is rotated by motor 17 for a short period of time, on the order of two minutes for example, to effect a spray action within chamber 11; then motor 17 is reversed to operate pump 18 and discharge the wash fluid from chamber 11 out through effluent discharge 22, and valve 23 is closed. This may be followed by a second preliminary rinse on the same order as described immediately above, and then by a washing step also similar to the first preliminary rinse except that the introduction of wash fluid and the circulation thereof by pump 18 continue for a longer period of time and, also, a detergent is employed during this time. There then follows at least one rinse step similar to the preliminary rinse described. Finally, a drying step of predetermined length, in which heating means 27 is energized to cause evaporation of moisture from the dishes, may take place.

Figure 2:
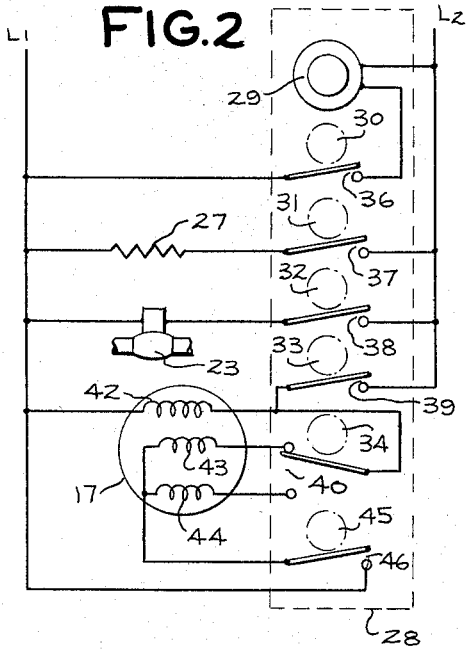
FIGURE 2 is a schematic circuit diagram of a control means employing the present invention.

In order to control dishwasher 10 through the series of operations described in the preceding paragraph, a sequence control means 28 is provided and may be positioned in door 13a as shown in FIGURE 1. Referring now to FIGURE 2, control means 28 includes a timer motor 29 which drives a series of cams 30, 31, 32, 33 and 34 which control, respectively, switches 36, 37, 38, 39 and 40. As can be seen from FIGURE 2, switch 36 controls energization of timer motor 29 by connecting timer motor 29 across power line $L_1$ and $L_2$. Switch 37 controls the operation of heating means 27 and switch 38 controls the operation of valve 23. Switch 39 serves as the main switch for motor 17. That is, switch 39 must be closed before run winding 42 or either of the start windings 43 and 44 may be energized. Switch 40 is the directional control switch for motor 17 since, depending upon its position, the closing of switch 39 energizes either start winding 43, causing motor 17 to start in one direction of rotation, or energizes start winding 44, causing motor 17 to start in the opposite direction of rotation.

The control arrangement thus far described is conventional in most respects and may be found on many commercially available automatic washing machines today. However, in addition to the structure thus far described there is usually provided, in electrical series with both start windings 43 and 44, a centrifugal switch responsive to the speed of motor 17, or a relay responsive to the current passing through run winding 42. The relay or the centrifugal switch is provided to disconnect the start winding once the motor approaches normal operating speed. As mentioned previously, either of these arrangements are quite expensive and it is a primary object of the present invention to obviate either of these costly switches.

In accordance with the present invention, there is provided an additional cam 45 driven by timer motor 29 and an additional switch 46 operated by cam 45. Switch 46 is in electrical series with both start windings 43 and 44 in a manner similar to the conventional centrifugal switch or relay discussed above. Cam 45 is configurated so that switch 46 is closed for a period of from .5 to 2.0 seconds every fifteen to twenty seconds of the entire cycle of dishwasher 10. The length of the periods during which switch 46 is closed is predetermined to be long enough to achieve a satisfactory start of motor 17 but not so long as to create overheating of the start winding. With this arrangement, excessive heating which would result from continuous energization of the start winding is prevented while there is still an assurance that motor 17 will restart within fifteen to twenty seconds after any closing of switch 39.

It should be appreciated that cam 45 and switch 46 are considerably less expensive than either a centrifugal switch or a relay and, at the same time, offer less possibility for malfunction. The savings in cost is realized primarily since there is only required the addition of a cam and switch to an already existing sequence control means.

Figure 3:
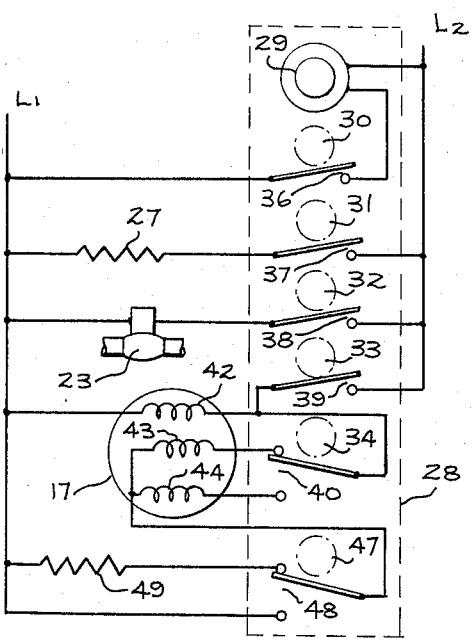
FIGURE 3 is a schematic circuit diagram showing a second specific embodiment of the present invention.

The embodiment shown in FIGURE 3 is identical to that shown in FIGURE 2 with the exception that cam 45 and switch 46 of FIGURE 2 are replaced by cam 47 and switch 48 in FIGURE 3 and an additional resistor 49 is associated with switch 48. With the embodiment of FIGURE 3, cam 47 controls switch 48 so that switch 48 either places resistor 49 in series with the start windings 43 and 44 or directly connects start windings 43 and 44 across the power source $L_1$ and $L_2$. In this manner, switch 48 may impress the full voltage of $L_1$–$L_2$ across the start winding at any desired time during the cycle to provide maximum starting torkue of motor 17 and, when such maximum is not required, may place resistor 49 in series with the start windings. It is to be understood that resistor 49 provides a sufficient voltage drop thereacross to preclude overheating of start windings 43 and 44. If desired, cam 47 may be configurated to position switch 48 in a third position, namely, intermediate the contacts so as to be completely open.

Thus it can be seen that the present invention provides an improved starting means for an electric motor having start windings which may be de-energized during a portion of the period of operation of the motor. This improved starting means obviates costly centrifugal switches or relays by providing a relatively inexpensive cam and cam-operated switch in a previously-required sequence control means to serve the function of the centrifugal switch or relay.

As will be evident from the foregoing description, certain aspects of the invention are not limited to the particular details of construction of the example illustrated, and it is contemplated that various other modifications or applications will occur to those skilled in the art. It is therefore intended that the appended claims shall cover such modifications and applications as do not depart from the true spirit and scope of the invention.

What I claim as new and desire to secure by Letters Patent of the United States is:

1. In an automatic washing machine having a sequence control means to conduct the machine through a series of operations and an electric motor to effectuate certain of said series of operations, said electric motor having a start winding which may be de-energized during certain periods of operation of said motor, the improvement comprising:
   (a) a switch adapted to energize said start winding when in a first position and de-energize said start winding when in a second position,
   (b) said switch being periodically cycled between said first position and said second position by said sequence control means,
   (c) said sequence control means maintaining said switch in said second position for a substantially longer time than in said first position.

2. In an automatic washing machine having a sequence control means to conduct the machine through a series of operation and an electric motor to effectuate certain of said series of operations, said electric motor having a start winding which may be de-energized during certain periods of operation of said motor, the improvement comprising:
   (a) a switch in electrical series circuit with said start winding,
   (b) said switch being periodically opened and closed by a cam driven by said sequence control means,
   (c) said cam being configurated to maintain said switch open for a substantially longer time than said cam maintains said switch closed.

3. In an automatic washing machine adapted to proceed through a series of operations comprising a wash cycle and having an electric motor to effectuate certain of said series of operations, said electric motor having a start winding which may be de-energized during certain periods of operation of said motor, a control means comprising:
   (a) a timer motor,
   (b) a plurality of cams driven by said timer motor,
   (c) a plurality of switches operated by said cams,
   (d) one of said plurality of switches being adapted to periodically de-energize and re-energize the start winding throughout the wash cycle,
   (e) the one of said plurality of cams which operates said one of said plurality of switches being so configurated that said one of said plurality of switches de-energizes for a substantially longer time than it energizes the start winding.

4. In an automatic washing machine having a sequence control means to conduct the machine through a series of operations and an electric motor to effectuate certain of said series of operations, said electric motor having a start winding, the improvement comprising:
   (a) a switch in electrical series with said start winding, (b) a resistor of sufficient resistance to prevent overheating of said start winding when said resistor is in series with said start winding,
(c) said switch having a first position connecting said start winding in series with said resistor and having a second position shunting said resistor,
(d) said switch being movable by said sequence control means from said second position to said first position.

References Cited by the Examiner

UNITED STATES PATENTS

| | | | |
|---|---|---|---|
| 3,029,825 | 4/1962 | Cushing | 318—221 X |
| 3,078,405 | 2/1963 | Tice | 318—443 X |
| 3,185,867 | 5/1965 | Bowman | 318—224 X |
| 3,215,919 | 11/1965 | Holzer | 318—486 X |

ORIS L. RADER, *Primary Examiner.*

G. Z. RUBINSON, *Assistant Examiner.*